Patented Feb. 13, 1945

2,369,212

UNITED STATES PATENT OFFICE 2,369,212

METHOD OF MANUFACTURING BORON TRICHLORIDE

Hugh S. Cooper, Cleveland, Ohio, assignor of one-half to Frank H. Wilson, Cleveland, Ohio No Drawing. Application March 28, 1944, Serial No. 528,473

9 Claims. (Cl. 23—205)

This invention relates to a process for producing metal chloride compounds and more particularly to a process for producing boron trichloride ($BCl_3$).

Heretofore in the art it has been proposed to produce boron trichloride by passing chlorine gas over a mixture of boron trioxide and carbon heated to elevated temperatures. Various difficulties have heretofore been recognized in the practice of this general method, the principal difficulty being to regulate the reduction-chloridizing reaction in such a manner as to substantially eliminate free chlorine from the exit gases consisting of CO and $BCl_3$ thereby to avoid the formation of phosgene ($COCl_2$), a chloride compound which has a boiling point so close to the boiling point of boron trichloride that the separation of the two chloride compounds by fractional distillation or condensation is substantially impossible, and to eliminate chlorine from the condensed $BCl_3$.

The object of the present invention is to provide an improved method of producing boron trichloride.

Another object is to provide an economically practical method of producing boron trichloride substantially free of phosgene and relatively low in chlorine.

Still another object is to provide a substantially moisture free sintered boron oxide and carbon product for chlorination to boron tri-chloride.

In accordance with these objects I have discovered that by subjecting an intimate mixture of finely divided boron oxide and carbon to a sintering heat-treatment at elevated temperatures approximating 1200–1300° C. prior to chlorination to substantially eliminate therefrom moisture and adsorbed atmospheric gases thereby to convert the mixture into a porous aggregate which may be crushed or otherwise broken up into sized fragments for chloridizing, the chloridizing reaction proceeds smoothly and efficiently at temperatures within the range 1000°–1200° C. at a rate that may be closely controlled and regulated to yield an effluent gas consisting of CO and $BCl_3$ that is relatively low in free chlorine, moisture and atmospheric gases to yield on condensation a relatively high purity $BCl_3$ condensate ranging from 80 to 95% $BCl_3$ balance chlorine.

The pre-chloridizing sintering of a mixture of finely divided boron oxide and carbon at the elevated temperature of 1200–1300° C. accomplishes two major results. The primary result is a complete removal of water from both constituents of the mixture and a substantially complete elimination of adsorbed or occluded gases. The secondary result is a partial reduction of the boron oxide to sub-oxides with substantial reduction in the relative proportions of boron, oxygen and carbon, present in the mixture.

Sintering of the mixture of boron oxide and carbon prior to chloridization also provides a porous sintered mass which may be subjected to crushing and screening operations to provide sized particles having a definite gas permeability factor at any given gas pressure which regulates the rate of the chloridizing reaction at any given chloridizing temperature.

Another advantage of pre-sintering the mixture of finely divided boron oxide and carbon prior to chloridization is that the amount of carbon in the mixture may be lowered to be not over 5 to 10% in excess of that theoretically required to effect substantially complete reduction of the boron oxide and that during pre-sintering a large proportion of this carbon is eliminated as carbon oxide, thus greatly lowering the possibility of phosgene formation during the chloridizing reaction, but also eliminating the danger of clogging up the gas condensation system by entrained carbon particles passing with the effluent gases into the system.

A further advantage of the pre-sintering step of the present invention is that by subsequently crushing the sinter to sized porous aggregates I am enabled to practice chloridization in a substantially continuous manner, i. e., feeding the sized sinter and the chlorine countercurrent to each other through a heat zone maintained at the desired chloridizing temperature by any one of the various means and mechanisms heretofore old and well known in the art, and forming, per se, no part of the present invention.

Still another advantage is that at temperatures approximating 1000–1200° C., the rate of chloridization of the sintered aggregates is relatively rapid as compared to the rate of the unsintered mixture and is free from the objectionable features of localized fusion areas normally obtained in chloridizing unsintered boron oxide and carbon mixtures to avoid which it has heretofore been necessary to employ relatively large excess amounts of carbon.

As one specific example of the practice of the present invention I form a mixture consisting of $B_2O_3$ and carbon, each in finely divided condition, the two constituents being admixed in the relative proportions conforming to the following equation:

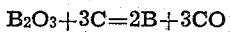

$$B_2O_3 + 3C = 2B + 3CO$$

with the carbon from 5 to 10% in excess of the theoretical amount to conform with this formula.

This mixture is disposed in a graphite crucible and tamped down therein as much as possible and the crucible and contents covered to exclude the atmosphere therefrom are heated to a temperature within the range 1200–1300° C. for an extended time interval, depending on the mass of mixture, until the evolution of gases from the mixture substantially terminates or slows down to a relatively low volume.

Alternately, the mixture of oxide and carbon may be compacted into large sized briquets and similarly heated without essential departure from the present invention.

Following this heating, the container and contents are cooled to atmospheric temperatures before exposing the sintered material to atmospheric gases. The sintered material after removal from the container is crushed to aggregates of from ¼ inch to 2 inches diameter and screened to eliminate the particle sized material below ¼ inch. The small particle sized material may be incorporated in subsequently formed mixtures of boron oxide and carbon and re-sintered therewith.

The sized sinter particles are then subjected to chloridization by passing chlorine gas therethrough while heated to a temperature approximating 1000°–1200° C. Preferably this is accomplished by sustaining a column of the sized particles vertically in a container, heating the column to the temperature of 1000–1200° C. and feeding chlorine pre-heated to 500° C. to 1000° C. into the bottom of the container for passage upwardly through the said column, the heighth and cross-sectional area of the heated portion of the column being selected relative to the amount of the chlorine introduced so as to obtain substantially complete conversion of the chlorine to $BCl_3$ before passing out of the top of the column.

As $BCl_3$ has a boiling point approximating 12.5° C., this compound passes off as a gas and may be continuously withdrawn from the top of the container along with the carbon monoxide generated, the withdrawn gases being passed through a cooling condenser, cooled to below 12.5° C., to effect the condensation separation of the $BCl_3$ from the carbon monoxide.

By the provision of suitable means to feed the sized sinter at a substantially constant rate into the top of the chloridizing chamber the rate being relative to the chloridizing rate to maintain a substantially constant heighth of sinter in the column, the chloridizing process may be standardized and made substantially continuous.

In the practice of the chloridizing reaction, the specific apparatus employed may be widely varied without essential departure from the present invention, as one skilled in the art will recognize. The essential condition to be provided in any apparatus employed in the practice of this chloridizing reaction, is to provide a gas permeable column of the sized particles heated to the reaction temperature of 1000–1200° C., the heighth and cross-section of the column being proportioned relative to the amount of chlorine supplied to the bottom of the column to obtain substantially complete conversion of the chlorine into $BCl_3$ before passing out of the heated portion of the column to the condenser. The major problem involved is the provision of adequate means to maintain the sinter column at the desired chloridizing temperature and to provide means to pre-heat the chlorine to the same temperature to eliminate the cooling effect of the gas passing into the column. The provision of these means, per se, forms no part of the present invention.

By the practice of the present invention substantially all of the boron and carbon present in the pre-sintered heated aggregates ultimately may be converted into $BCl_3$ and CO. Usually, however, there is a gradual accumulation of carbon residues in the bottom of chloridizing chamber due to the pressure of a slight excess of carbon in the sintered aggregates which necessitate interruption of the continuous chloridization operation from time to time to clean out these carbon residues. Relatively extended periods of continuous operation may generally be obtained intermediate shutdowns for cleaning out the carbon residues, due to the relatively low carbon excess required in the present invention.

From the above description of the present invention, it is believed apparent that many modifications and adaptations may be made without essentially departing from the nature and scope thereof and all such are contemplated as may fall within the scope of the following claims.

What I claim is:

1. In the manufacture of boron trichloride by the process comprising passing chlorine through a heated mixture of boron oxide and carbon, the improvement which comprises heating the mixture of boron oxide and carbon to elevated temperatures above about 1200° C. to eliminate therefrom all moisture and adsorbed atmospheric gases contained therein and to effect a consolidation of the mixture into a porous sintered product consisting largely of boron sub-oxides before chloridizing the said mixture.

2. The improvement of claim 1, wherein the carbon content of the said mixture is limited to from 5 to 10% in excess of that theoretically required to remove all the oxygen from the $B_2O_3$ as carbon oxide.

3. In the manufacture of boron trichloride by the process comprising passing chlorine through a heated mixture of boron oxide and carbon, the improvement which comprises converting the said mixture into a porous sintered mass consisting largely of boron sub-oxides by compacting the same and heating the compacted mixture to temperatures approximating 1200–1300° C. for an extended time interval, crushing the sintered mass to sized aggregates, disposing the aggregates in a column, heating the column to 1000 to 1200° C., and passing chlorine through the said heated column at a rate not in excess of that providing for the substantially complete conversion of the chlorine to boron trichloride before passing out of the column.

4. The method of producing boron trichloride which comprises forming a mixture consisting of boron oxide and carbon with the carbon content in small excess over that theoretically required to convert the oxygen content of the oxide to carbon monoxide, compacting and heating the said mixture at elevated temperatures approximating 1200–1300° C. to drive off the moisture and adsorbed atmospheric gases present therein and to convert the same into a porous sintered mass consisting largely of boron sub-oxides, crushing the porous mass to sized porous aggregates, and circulating chlorine through the sized porous aggregates heated to 1000–1200° C. to convert the boron content thereof to boron trichloride.

5. The method of claim 4, wherein in said last step the said porous aggregates are formed into a column heated to 1000–1200° C. and the said chlorine pre-heated to 1000° C. is passed through the said column at a rate not in excess of that providing substantially complete conversion of the chlorine to boron trichloride as it passes out of the top of the said column, and wherein the heighth of the said column is maintained substantially constant by addition of sized aggregates thereto.

6. In the manufacture of boron trichloride by the method comprising passing chlorine through a heated mixture of boron oxide and carbon, the improvement which comprises pre-sintering the said mixture to remove moisture and atmospheric gases therefrom and to convert the same into a porous sintered mass consisting largely of boron sub-oxides, crushing the sintered mass to sized aggregates, forming a column of said aggregates heated to 1000–1200° C. and passing chlorine pre-heated to 500–1000° C. through said column at a rate not in excess of that providing for the substantially complete conversion of the chlorine to boron trichloride before passing out of the said column.

7. The method of claim 6, wherein the gases passing out of said column are cooled to a temperature somewhat below the condensing temperature of $BCl_3$ and the condensate obtained is separated from the gases remaining.

8. The method of forming $BCl_3$ which comprises forming a mixture consisting of $B_2O_3$ and C in the relative proportions of 1 molar weight $B_2O_3$ to 3 molar weights of C plus 5 to 10% excess of C, finely dividing and intimately mixing the $B_2O_3$ and C together, sintering the mixture together into a porous aggregate by heating the same to 1200–1300° C. under a positive pressure, cooling and crushing the sintered aggregate to substantially uniform sized particles, subjecting the said particles to the action of chlorine gas while heated to elevated temperatures approximating 1000–1200° C. and collecting the $BCl_3$ formed.

9. The method of claim 8, wherein the rate of chloridization of said particles is limited to a rate providing for the substantially complete conversion of the chlorine to $BCl_3$ before passing out of contact with the said heated particles and wherein the CO and $BCl_3$ gases evolved from said heated particles are cooled to the condensation temperature of $BCl_3$ to separate the same from the CO.

HUGH S. COOPER.